(12) United States Patent
Tsuruhara et al.

(10) Patent No.: US 7,292,021 B2
(45) Date of Patent: Nov. 6, 2007

(54) ANOMALY DETECTOR FOR VIBRATORY ANGULAR RATE SENSOR

(75) Inventors: Takao Tsuruhara, Oobu (JP); Hajime Ito, Ichinomiya (JP); Shunji Mase, Handa (JP)

(73) Assignee: Denso Corporation, Kariya (JP)

( * ) Notice: Subject to any disclaimer, the term of this patent is extended or adjusted under 35 U.S.C. 154(b) by 103 days.

(21) Appl. No.: 11/245,453

(22) Filed: Oct. 7, 2005

(65) Prior Publication Data

US 2006/0077013 A1   Apr. 13, 2006

(30) Foreign Application Priority Data

Oct. 8, 2004   (JP) .............................. 2004-296097
Dec. 27, 2004  (JP) .............................. 2004-376270

(51) Int. Cl.
G01R 13/14  (2006.01)
G01P 3/44   (2006.01)
G01P 9/00   (2006.01)
G01P 15/08  (2006.01)

(52) U.S. Cl. ................................ 324/76.15; 73/504.12
(58) Field of Classification Search ............. 324/76.15; 73/504.12

See application file for complete search history.

(56) References Cited

U.S. PATENT DOCUMENTS 3,991,379 A * 11/1976 Chadwick et al. ............. 327/98
6,267,008 B1 * 7/2001 Nagao ....................... 73/504.12
2002/0017135 A1 * 2/2002 Mori et al. ................ 73/504.12

FOREIGN PATENT DOCUMENTS

JP           8-77714       3/1996
JP           2001-304871   10/2001

* cited by examiner

Primary Examiner—Walter Benson
Assistant Examiner—Timothy J Dole
(74) Attorney, Agent, or Firm—Posz Law Group, PLC

(57) ABSTRACT

In an anomaly detector that detects an abnormal condition of an oscillation signal of a circuit such as a vibratory sensing circuit, the oscillation signal, having AC and DC components, is converted to a pair of first and second signals of either opposite-polarity DC amplitudes or opposite-phase alternating amplitudes. The first and second signals are combined to cancel the AC component of the oscillation signal to detect the DC component. The DC component is then compared with the upper and lower thresholds of a decision range to produce an alarm if the DC component goes outside the decision range. In one embodiment, the first and second signals are produced by detecting positive and negative peak values of the oscillation signal at intervals. In a second embodiment, the first signal is produced by high-pass filtering the oscillation signal as a replica of the AC component and the second signal is the oscillation signal itself.

16 Claims, 8 Drawing Sheets

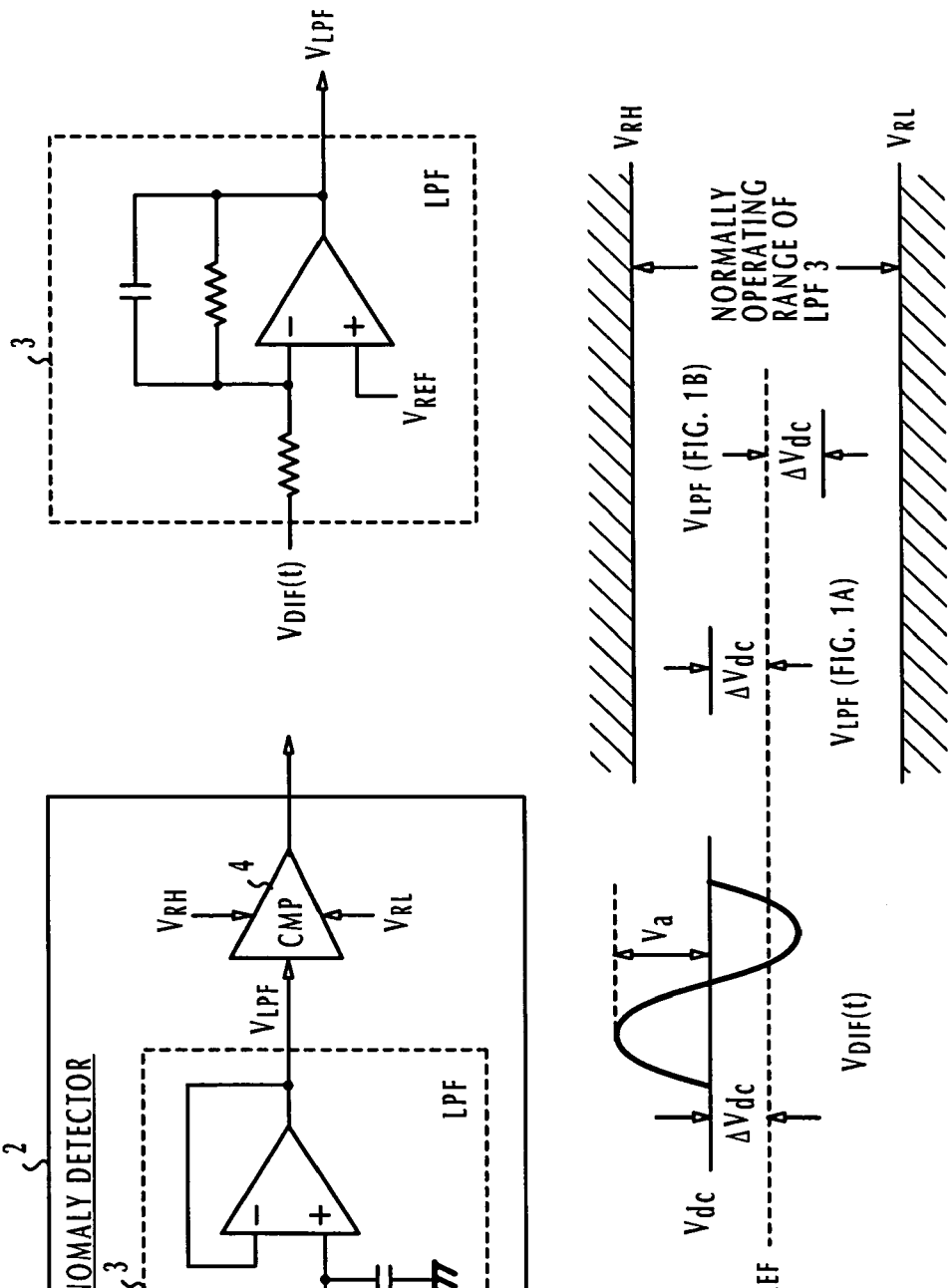
FIG. 1A PRIOR ART
FIG. 1B PRIOR ART
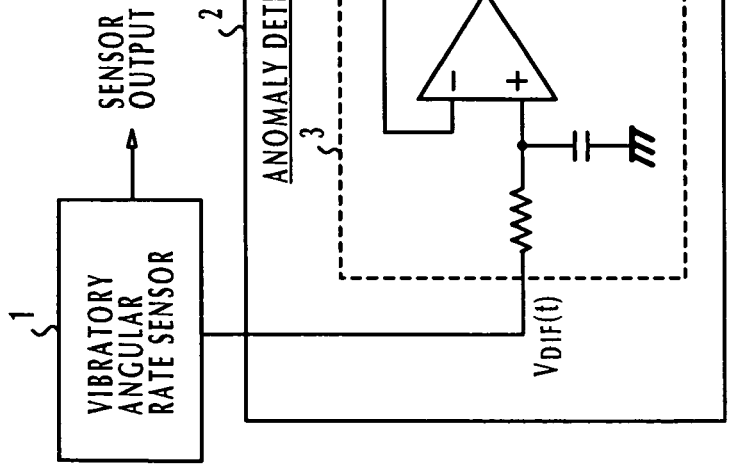
FIG. 2 PRIOR ART

ANOMALY DETECTOR FOR VIBRATORY ANGULAR RATE SENSOR

CROSS-REFERENCE TO RELATED APPLICATIONS

This application is based on Japanese Patent Applications No. 2004-296097, filed Oct. 8, 2004 and No. 2004-376270, filed Dec. 27, 2004, which are incorporated herein by reference.

BACKGROUND OF THE INVENTION

1. Field of the Invention

The present invention relates to vibratory angular sensors and more specifically to an anomaly detector for the vibratory angular sensors.

2. Description of the Related Art

A known vibratory angular rate sensor is provided with a differential amplifier for producing a differential output indicating the difference between the outputs of a pair of sensing elements (or gyro-sensor). A predetermined frequency component is detected from the differential output using a synchronous detector and a low-pass filter. The differential output has a DC offset voltage, which win become abnormal when the bonding wire between the sensor and the differential amplifier is broken, for example. For this reason, an anomaly detector 2, as shown in FIG. 1A, has been developed for a vibratory angular rate sensor 1 for detecting when the offset voltage of the differential output goes abnormal. The known anomaly detector 2 is comprised of a low-pass filter 3 for filtering the differential output of the sensor 1. The output of the low-pass filter 3 is compared in a window comparator 4 with an upper threshold voltage $V_{RH}$ and a lower threshold voltage $V_{RL}$. When the angular rate sensor is operating properly, the low-pass filter output lies between the upper and lower threshold voltages and a high-level output is delivered from the window comparator 4. When the sensor is not operating properly, the low-pass filter output rises above the upper threshold voltage or falls below the lower threshold voltage, and the window comparator 4 produces a low-level, warning signal.

More specifically, the differential output of the angular rate sensor 1 is represented as:

$$V_{DIF}(t) = V_a \sin \omega_d t + V_{dc} \quad (1)$$

where $\omega_d = 2\pi f_d$ and $V_{dc}$ is the DC offset voltage. The low-pass filter output $V_{LPF}$ is equal to the offset voltage $V_{dc}$ if the low-pass filter is of a non-inverting type as shown FIG. 1A and equal to $2 \times V_{REF} - V_{dc}$ if the low-pass filter is of an inverting type as shown in FIG. 1B, where $V_{REF}$ is the reference voltage which is impressed on the inverting input of the operational amplifier and corresponds to the midpoint between the upper and lower threshold voltages $V_{RH}$ and $V_{RL}$ of the window comparator 4. As shown in FIG. 2, the window comparator 4 compares the output voltage $V_{DIF}(t)$ of either low-pass filter 3 with the reference voltages $V_{RH}$ and $V_{RL}$ and determines whether the difference $V_{DIF}(t) - V_{REF} = \Delta V_{dc}$ is outside the range between $V_{RH}$ and $V_{RL}$. If this is the case, the sensor is abnormal and the window comparator 4 produces a warning signal.

The output of the low-pass filter 3 contains a ripple component (with frequency equal to $f_d$), which is desired to be as small as possible. Further, it is necessary that the cutoff frequency ($f_c$) of the low-pass filter 3 is sufficiently lower than the frequency $f_d$ of the input differential voltage. For these reasons, low-pass filter 3 must be designed with a large time constant value. However, the use of large time-constant low-pass filter will introduce a timing delay in detecting an abnormal offset voltage. If a gradually varying anomaly occurs, the prior art detector cannot quickly detect the fault due to the introduced timing delay. Further, with such a low-pass filter the time constant value may be large in comparison with the varying rate of a transient abnormal offset voltage. If such a transient anomaly occurs in a period smaller than the time constant of low-pass filter 3, the prior art anomaly detector 2 would fail to detect the anomaly.

SUMMARY OF THE INVENTION

It is therefore an object of the present invention to enable quick detection of a gradually varying anomaly of a DC component of an oscillation signal.

Another object of the present invention is to enable detection of a transient anomaly of a DC component of an oscillation signal.

According to a first aspect of the present invention, there is provided an anomaly detector for detecting a DC component of an oscillation signal, comprising a DC component detector that detects a DC component of the oscillation signal, the detector including no timing delay element that introduces a delay in detecting the DC component. A window comparator, associated with the detector, that checks to see if the detected DC component is within a predetermined range to determine whether or not the oscillation signal is normal or abnormal.

According to a second aspect of the present invention, there is provided a sensing circuit comprising a sensing element that produces an oscillation signal representing oscillations of the sensing element in response to an externally applied force, and a DC component detector that detects a DC component of the oscillation, the detector including no timing delay element that introduces a delay in detecting the DC component. A window comparator is associated with the detector to check to see if the detected DC component is within a predetermined decision range to determine whether or not the sensing circuit is operating normally.

More specifically, the DC component detector of the anomaly detector or the sensing circuit produces, from the oscillation signal, a pair of first and second signals having amplitudes of opposite polarities, at least one of the first and second signals containing the DC component of the oscillation signal, and combines the first and second signals to detect the DC component by mutually canceling the amplitudes of opposite polarities. Preferably, the first signal is a DC amplitude of first polarity containing the DC component, and the second signal is a DC amplitude of second polarity containing said DC component, the second polarity being opposite to the first polarity. Alternatively, the first signal is alternating amplitudes of first phase, and the second signal is alternating amplitudes of second phase opposite to the first phase, one of the first and second signals containing the DC component of the oscillation signal.

More specifically, the DC component detector comprises a maximum detector that detects a positive peak value of the oscillation signal at periodic intervals to produce the first signal, and a minimum detector that detects a negative peak value of the oscillation signal at the periodic intervals synchronously with the maximum detector to produce the second signal. The DC component detector produces the first signal by extracting an AC component from the oscillation signal and cancels an AC component contained in the second signal with the extracted AC component.

According to a third aspect there is provided a method of detecting anomaly of an oscillation signal, comprising the steps of detecting a DC component of the oscillation signal without using a timing delay element that introduces a delay in detecting the DC component, and determining whether the detected DC component is within a predetermined range. The step of detecting a DC component may comprise the steps of converting the oscillation signal either to a pair of first and second signals of opposite-polarity DC amplitudes or opposite-phase alternating amplitudes so that at least one of the first and second signals contains the DC component of the oscillation signal, and combining the first and second signals to detect the DC component. More specifically, the first and second signals are produced by detecting a positive peak value and a negative peak value of the oscillation signal synchronously at periodic intervals. Alternatively, the first signal is produced by extracting an AC component from the oscillation signal to cancel an AC component contained in the second signal with the extracted AC component

BRIEF DESCRIPTION OF THE DRAWINGS

The present invention will be described in detail with reference to the following drawings, in which:

FIGS. 1A and 1B are circuit diagrams of prior art anomaly detectors;

FIG. 2 is a waveform diagram illustrating the operation of the prior art anomaly detectors;

DETAILED DESCRIPTION

Figure 3:
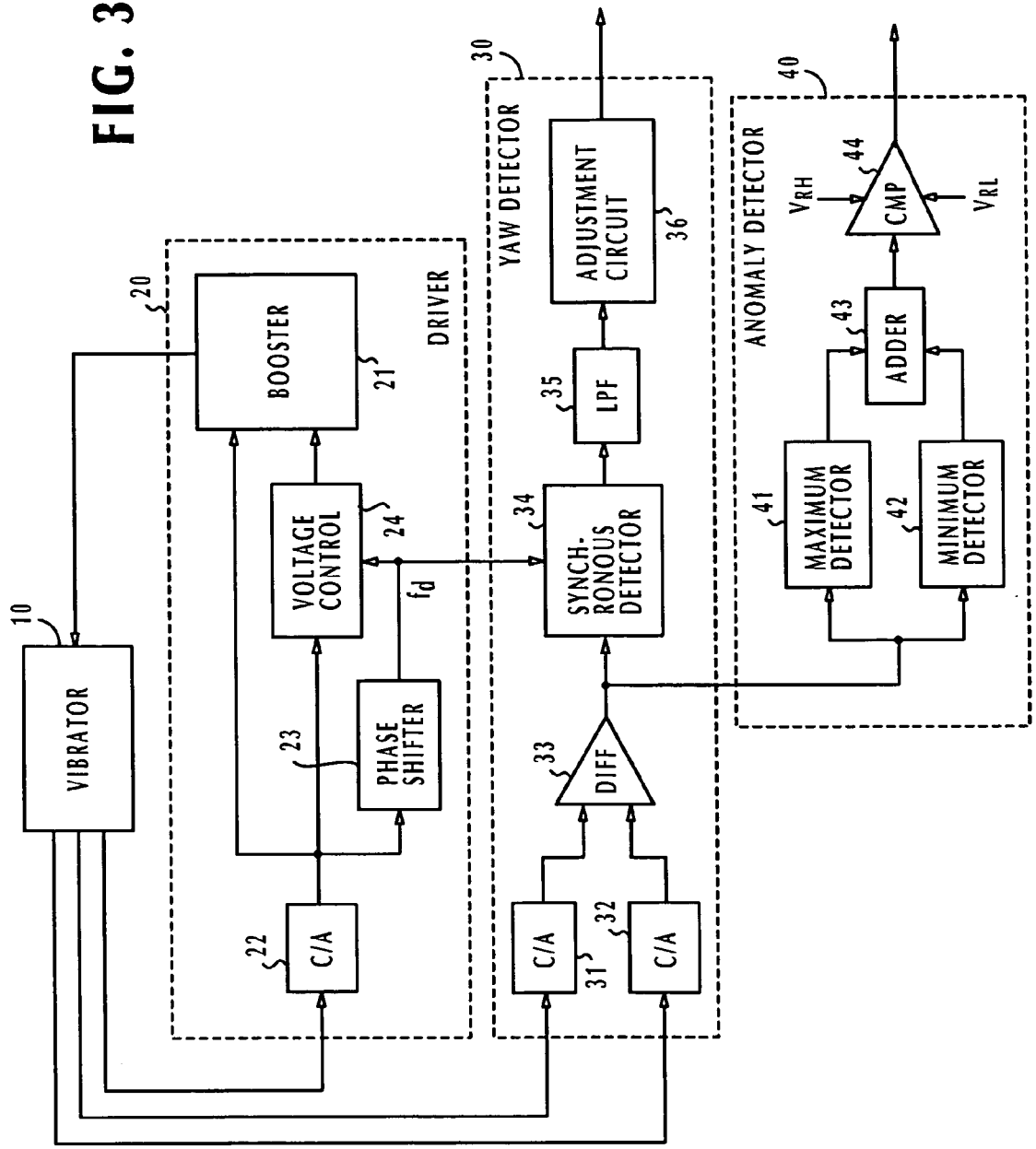
FIG. 3 is a block diagram of an anomaly detector of a first embodiment of the present invention used in conjunction with a vibratory angular rate sensor.

In FIG. 3, a vibratory angular rate sensor is illustrated as one exemplary sensing circuit for which an anomaly detector according to a first embodiment of the present invention is provided.

The vibratory angular rate sensor comprises a vibrator 10, a driver 20 and a yaw detector 30. Vibrator 10 has a pair of yaw sensing elements and a driving element, not shown. The driving element is driven by the driver 20 to produce mechanical oscillations. If a yaw motion is generated, the sensing elements are caused to vibrate by the Coriolis force, producing a pair of oscillation signals. In addition, the vibrator 10 produces a monitoring signal indicating whether the driving element is operating properly.

Driver 20 includes a charge amplifier 22 that converts the monitoring signal to a voltage and supplies the voltage to a booster 21 that drives the vibrator 10. A phase shifter 23 is provided to compensate for the timing difference between the output of booster 21 and the monitoring signal from the vibrator 10, so that the output of booster 21 is maintained at the desired oscillation frequency $f_d$. A voltage controller 24 generates a constant amplitude voltage depending on the outputs of charge amplifier 22 and phase shifter 23. The driving signal is generated by the booster 21 by using the outputs of charge amplifier 22 and voltage controller 24.

In the yaw detector 30, a pair of charge amplifiers 31, 32 convert the oscillation signals of the vibrator 10 to corresponding voltages, which are supplied to the differential amplifier 33, as described previously in relation to the prior art. The oscillation signal from the output of differential amplifier 33 is applied to a synchronous detector 34 for synchronously detecting a spectral component having the frequency $f_d$ using the delayed output from the phase shifter 23. The detected frequency component as well as those having lower frequencies are filtered through a low-pass filter 35. By performing zero-point, temperature and sensitivity adjustment on the lowpass-filtered frequency components, an adjustment circuit 36 delivers the output of yaw sensor 30.

The oscillation signal from the differential amplifier 33 is supplied to an anomaly detector 40. In the first embodiment of the present invention, the anomaly detector 40 essentially comprises an AC component detector that converts the oscillation signal to a pair of first and second signals of DC amplitudes opposite in polarity to each other ($+V_a$, $-V_a$). Each of the first and second signals contains the DC component ($V_{dc}$) of the oscillation signal. The anomaly detector 40 further includes a canceller that combines the first and second signals to cancel the DC amplitudes so that twice the value of the DC component ($2V_{dc}$) is detected.

Specifically, the AC component detector of the first embodiment comprises a maximum (positive peak) detector 41 for detecting a positive peak value of the input signal from the differential amplifier 33 and a minimum (negative peak) detector 42 for detecting a negative peak value of the input signal from the same differential amplifier, and the second circuit comprises an adder 43 that combines the outputs of the detectors 41 and 42. A window comparator 44 is provided that compares the output of the adder 43 with upper and lower threshold values to determine whether or not the angular rate sensor is working properly.

Figure 4:
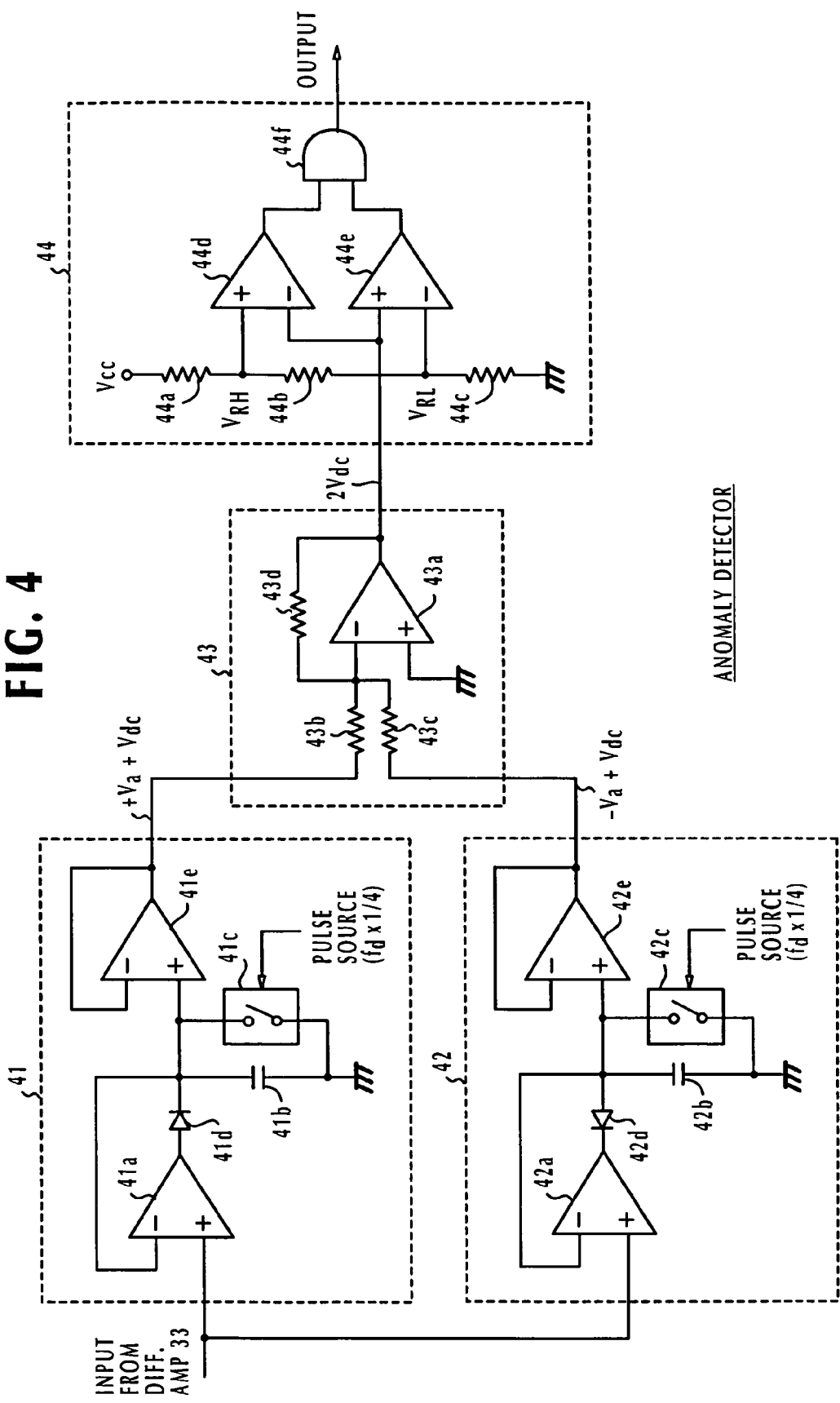
FIG. 4 is a circuit diagram of the anomaly detector of FIG. 3.

As shown in detail in FIG. 4, the maximum detector 41 is essentially a sample-and-hold circuit, which includes an operational amplifier 41a having an inverting input coupled to the output of differential amplifier 33 and to ground through a storage capacitor 41b. Operational amplifier 41a has its output coupled through a diode 41d to its inverting input. Diode 41d is connected in a sense that allows current to charge the capacitor 41b when the voltage at the output of operational amplifier 41a is higher than a voltage stored on the capacitor 41b. Capacitor 41b is shunted by a normally-open switch 41c. Switch 41c is operated in response to a reset pulse at intervals equal to four times the period $1/f_d$ to discharge the capacitor 41b. A maximum of the positive amplitudes generated during each sampling interval is stored on the capacitor 41b and impressed on an emitter follower, or buffer 41e and supplied to the first input of adder 43.

Minimum detector 42 is also a sample-and-hold circuit, which includes an operational amplifier 42a having an inverting input coupled to the output of differential amplifier 33 and to ground through a storage capacitor 42b. Operational amplifier 42a has its output coupled through a diode 42d to its inverting input. Diode 42d is connected in a sense opposite to that of diode 41d so that it allows current to charge the capacitor 42b when the voltage at the output of operational amplifier 41a is lower than a voltage stored on the capacitor 42b. Capacitor 42b is shunted by a normally-open switch 42c to discharge the capacitor 42c at intervals equal to four times the period $1/f_d$. A minimum of the negative amplitudes generated during each sapling interval is stored on the capacitor 42b and supplied through a buffer 42e to the second input of adder 43.

In the adder 43, the output of maximum detector 41 is applied through a resistor 43b to the inverting input of an operational amplifier 43a and the output of minimum detector 42 is applied through a resistor 43c to the same inverting input of the operational amplifier. A feedback resistor 43d is connected between the output and inverting input of operational amplifier 43a, the noninverting input of the operational amplifier being connected to ground. Operational amplifier 43a produces an output indicating a sum of the detected maximum and minimum values of the differential output voltage.

Window comparator 44 consists of a series of resistors 44a, 44b, 44c connected between a voltage source Vcc and ground to provide upper and lower threshold voltages $V_{RH}$ and $V_{RL}$. Comparators 44d and 44e are provided for comparing the output of adder 43 with the upper and lower threshold voltages, respectively. Comparator 44d produces a high-level output when the adder output is lower than the upper threshold voltage and the comparator 44e produces a high-level output when the adder output is higher than the lower threshold voltage. An AND gate 44f, connected to the outputs of comparators 44d and 44e, produces a high-level output when the adder output is in the range between the upper and lower threshold voltages. When the adder output goes outside of this range, a low-level output is delivered from the AND gate 44f as a warning signal.

When the angular rate sensor is operating normally, the positive and negative amplitudes of the sinusoidal output voltage of differential amplifier 33 are of equal magnitude.

Figure 5A:
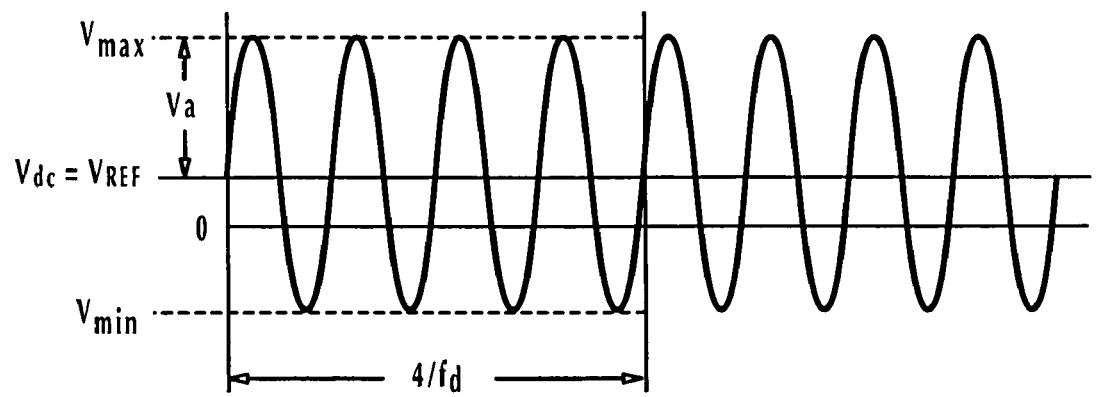
FIG. 5A is a waveform diagram illustrating a waveform generated when the angular rate sensor is operating normally with no yaw motion detected.
Figure 5B:
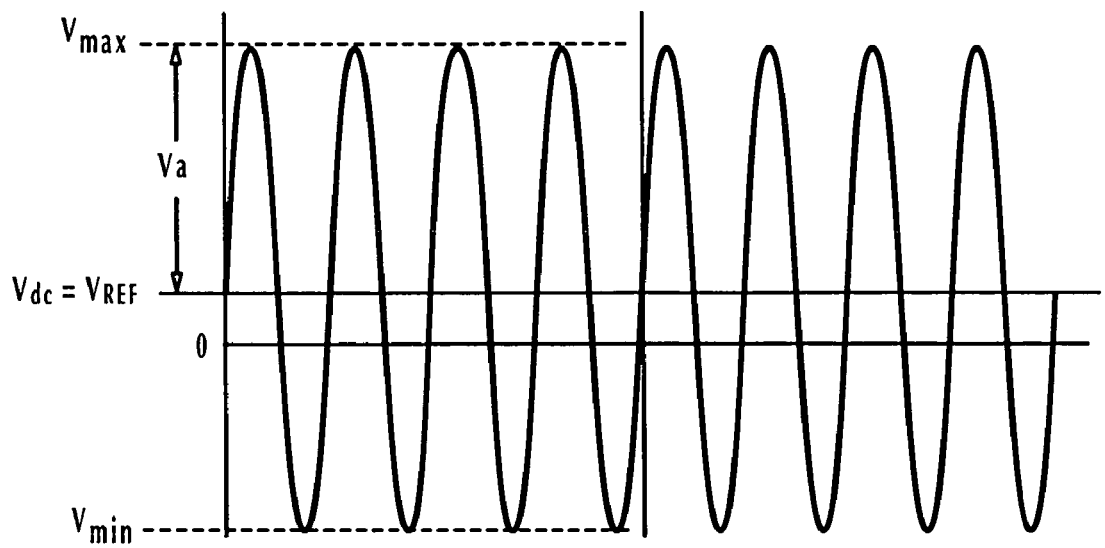
FIG. 5B illustrates a waveform that is generated when the angular rate sensor is operating normally with a yaw motion detected.

When no yaw motion is generated in the sensor, the both amplitudes of the differential output is relatively low as shown in FIG. 5A, and when a yaw motion is generated, the differential output increases its amplitudes as shown in FIG. 5B.

As long as the angular rate sensor is operating properly, the DC offset voltage $V_{dc}$ is normal and the positive and negative amplitudes of the differential output voltage are equal to each other and the outputs of maximum and minimum detectors 41 and 42 are given by:

$$V_{max} = V_a + V_{dc} \quad (2)$$

$$V_{min} = -(V_a - V_{dc}) \quad (3)$$

Therefore, the output of adder 43 is:

$$V_{max} + V_{min} = 2 \times V_{dc} \quad (4)$$

By treating the offset voltage $V_{dc}$ as a reference voltage $V_{REF}$ that occurs when the angular rate sensor is operating properly, hence the oscillation signal is normal, the output of adder 43 is given as follows:

$$V_{max} + V_{min} = 2 \times V_{REF} \quad (5)$$

Thus, the midpoint voltage of the window comparator 44 between its upper and lower threshold voltages is set to correspond to $2 \times V_{REF}$.

Figure 6:
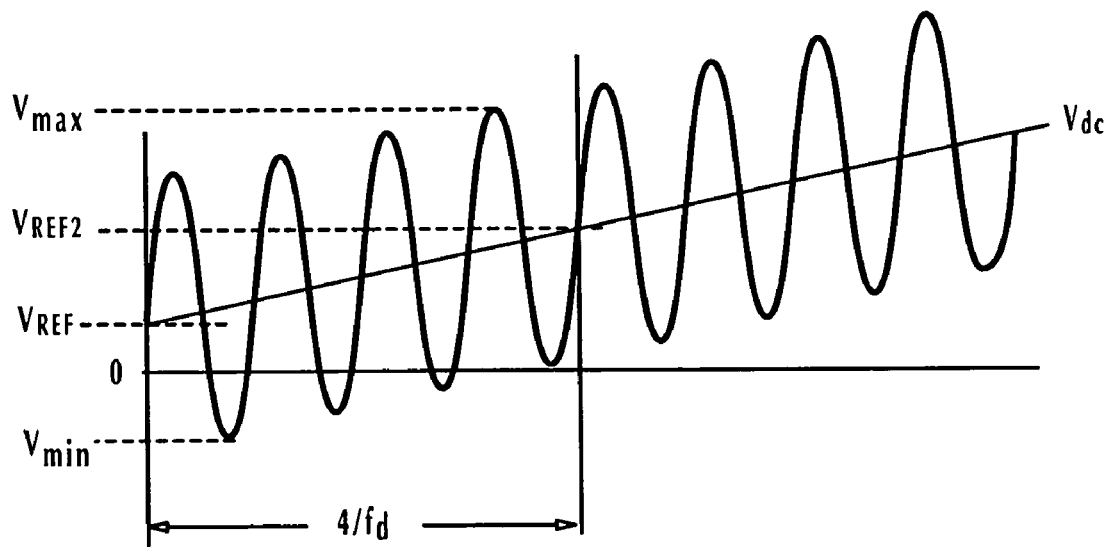
FIG. 6 illustrates a waveform that is generated when the DC offset voltage is gradually increased abnormally.
Figure 7:
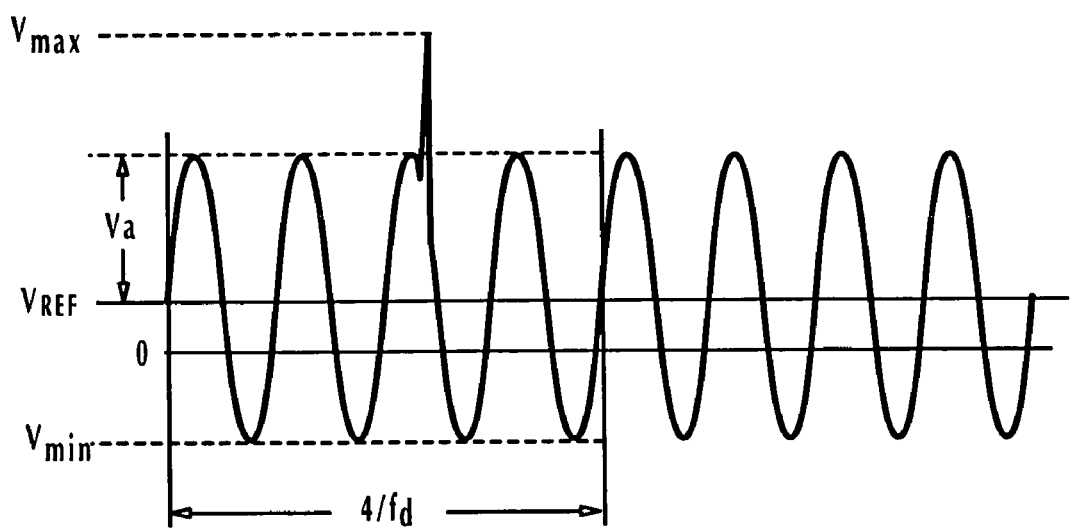
FIG. 7 illustrates a waveform that is generated when the differential output of the angular rate sensor is contaminated with a spike.

If the DC offset voltage goes abnormal, the DC offset voltage of the differential output may drift from $V_{REF}$ to $V_{REF2}$ as shown in FIG. 6 or the differential output is contaminated with a spike as shown in FIG. 7.

Under such abnormal conditions, the output of adder 43 is no longer equal to $2 \times V_{REF}$. In the case of FIG. 6, the adder output drifts from $2 \times V_{REF}$ to $2 \times V_{REF2}$ during the first four-cycle period, and in the case of FIG. 7, it drifts to a point higher than $2 \times V_{REF}$. In either case, the adder output goes out of the range of window comparator 44.

Due to the use of no low-pass filter, the anomaly detector 40 has no timing delay for detecting an abnormal offset voltage and is capable of detecting a transient abnormal rise that can occur in the DC offset voltage.

Figure 8:
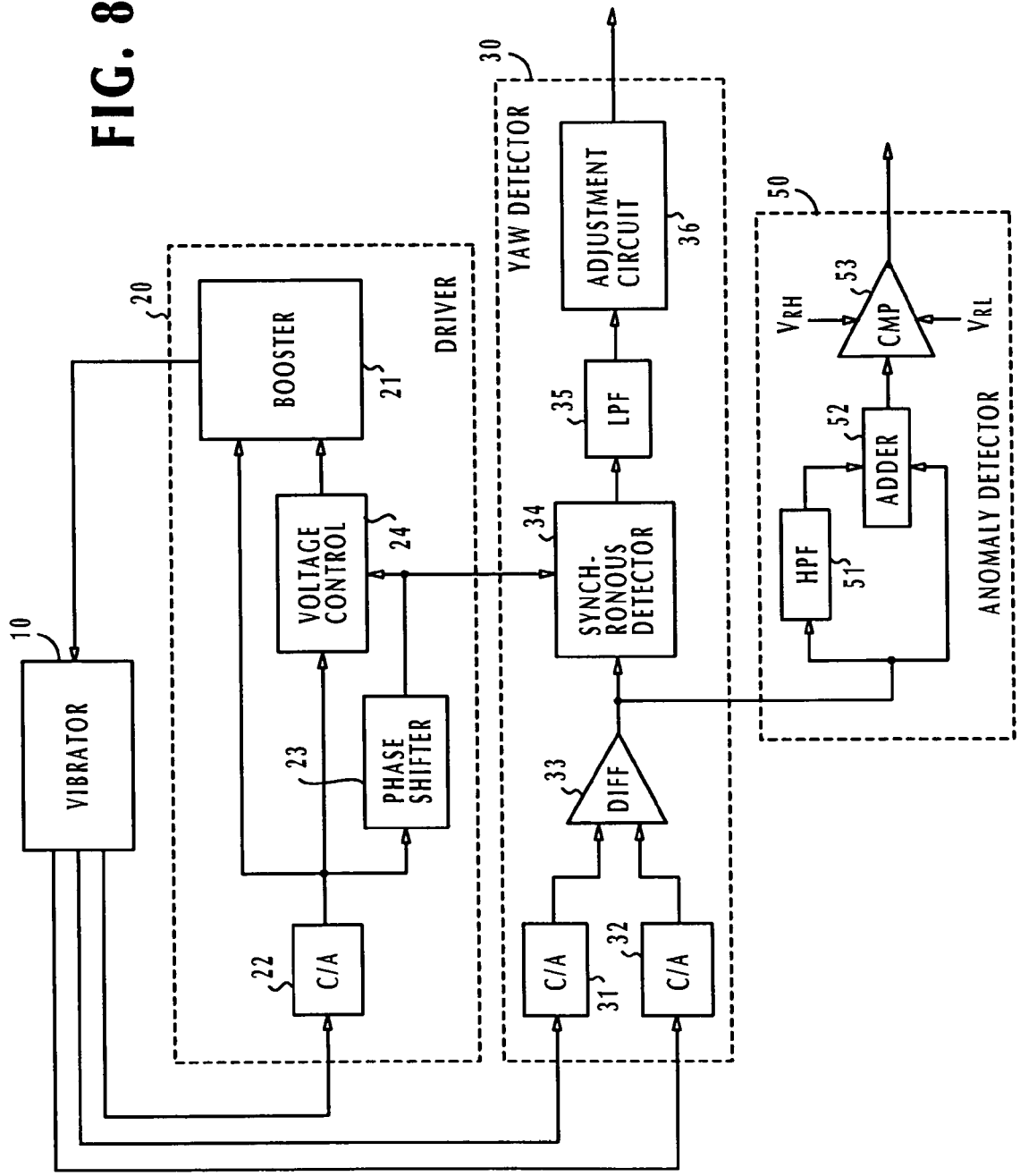
FIG. 8 is a block diagram of an anomaly detector according to a second embodiment of the present invention.

FIG. 8 shows a second embodiment of the present invention in which elements corresponding to those of FIG. 3 are marked with the same numerals and the description thereof is omitted.

The anomaly detector of the second embodiment, designated 50, essentially comprises an AC component detector that converts the oscillation signal to a pair of first and second signals of alternating amplitudes opposite in phase to each other. The anomaly detector 40 further includes a canceller that combines the first and second signals so that the opposite-phase alternating amplitudes are cancelled to detect the DC component ($V_{dc}$).

Specifically, in the second embodiment, the AC component detector includes a high-pass filter 51 which produces a first signal $V_a \sin(\omega_d t + \pi)$ by high-pass filtering the oscillation signal and a second signal $V_a \sin \omega_d t + V_{dc}$ which is the oscillation signal itself. The canceller comprises an adder 52 that receives the first signal from the high-pass filter 51 and the second signal (oscillation signal) from the differential amplifier 33 and provides a sum of the received signals to detect the DC component $V_{dc}$. A window comparator 53 is connected to the output of the adder 52.

As described in detail below, the high-pass filter 51 has the effect of producing an output which is opposite in phase to the oscillation signal.

Figure 9:
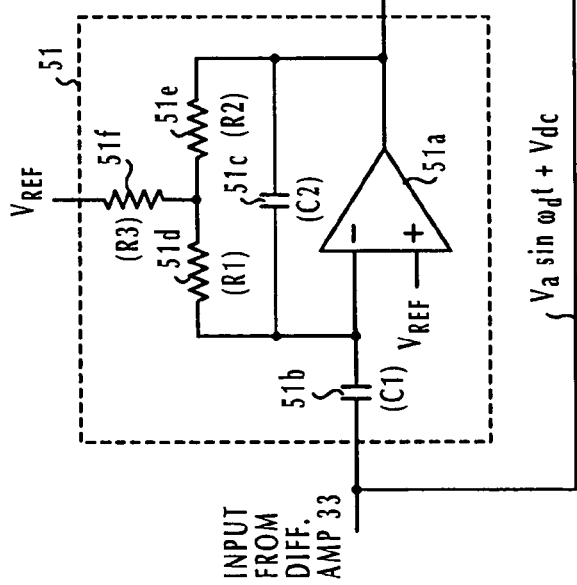
FIG. 9 is a circuit diagram of the anomaly detector of FIG. 8.

As shown in detail in FIG. 9, the high-pass filter 51 comprises an operational amplifier 51a with its inverting input coupled through a capacitor 51b to the output of differential amplifier 33 and its noninverting input being coupled to a source of reference voltage $V_{REF}$. The output of operational amplifier 51a is connected to its inverting input through an RC parallel feedback circuit formed with a capacitor 51c and a series of resistors 51d and 51e. The circuit node between resistors 51d and 51e is connected through a resistor 51f to the source reference voltage $V_{REF}$.

Assume that the equivalent resistance ($R_F$) or equivalent impedance ($|Z_F|$) of the resistor network connected in parallel with the capacitor 41c has the following relation:

$$R_F = |Z_F| ?1/(\omega_d \cdot C2) \quad (6)$$

Since the output of differential amplifier 33 is given by Equation (1), the high-pass filter 51 produces an output voltage $V_{HPF}(t)$ given as follows:

$$V_{HPF}(t) = -\frac{C1}{C2} V_a \sin(\omega_d t) + V_{REF} \quad (7)$$

where, C1 and C2 are the capacitance values of capacitors 51b and 51c, respectively.

Therefore, the amplitude of the AC component of high-pass filter output is C1/C2 times its input amplitude and the phase of the AC component is in reverse to its input phase. The DC component of the high-pass filter output is equal to the reference voltage $V_{REF}$.

Adder 52 comprises an operational amplifier 52a and a resistor network including a resistor 52b connected between the output of high-pass filter 51, the inverting input of operational amplifier 52a and a resistor 52c connected between the output of differential amplifier 33 and the same inverting input, and a feedback resistor 52d connected between the output and inverting input of the operational amplifier. The noninverting input of the operational amplifier 52a is connected to the source of reference voltage $V_{REF}$.

The output $V_{ADD}(t)$ of adder 52 is given by the following Equation:

$$V_{ADD}(t) = -\left[\frac{R6}{R4}\{V_{HPF}(t) - V_{REF}\} - \frac{R6}{R5}\{V_{DIF}(t) - V_{REF}\}\right] + V_{REF} \quad (8)$$

where, R4, R5, R6 are resistance values of resistors 52b, 52c and 52d, respectively.

Substituting Equations (7) and (1) for $V_{HPF}(t)$ and $V_{DIF}(t)$, respectively, of Equation (8) results in the following relation:

$$V_{ADD}(t) = \left(\frac{R6}{R4}\frac{C1}{C2} - \frac{R6}{R5}\right)V_a\sin(\omega_d t) + \frac{R6}{R5}(V_{REF} - V_{dc}) + V_{REF} \quad (9)$$

If the following relation holds, $$\frac{R6}{R4}\frac{C1}{C2} = \frac{R6}{R5} \quad (10)$$

the first term of Equation (9) is nullified to remove the AC component, leaving the DC component in the output of adder 52 as follows:

$$V_{ADD}(t) = \frac{R6}{R5}(V_{REF} - V_{dc}) + V_{REF} \quad (11)$$

Similar to the first embodiment, the window comparator 53 includes a series of resistors 53a, 53b, 53c connected between voltage source Vcc and ground to provide upper and lower threshold voltages $V_{RH}$ and $V_{RL}$. Note that the midpoint reference voltage between the upper and lower threshold voltages $V_{RH}$ and $V_{RL}$ is set to correspond to the reference voltage $V_{REF}$ that occurs when the oscillation signal is normal. Comparators 53d and 53e compare the output of adder 52 with the upper and lower threshold voltages, respectively. Comparator 53d produces a high-level output when the adder output is lower than the upper threshold voltage and the comparator 53e produces a high-level output when the adder output is higher than the lower threshold voltage. AND gate 53f produces a high-level output when the adder output is in the range between the upper and lower threshold voltages.

Figure 10:
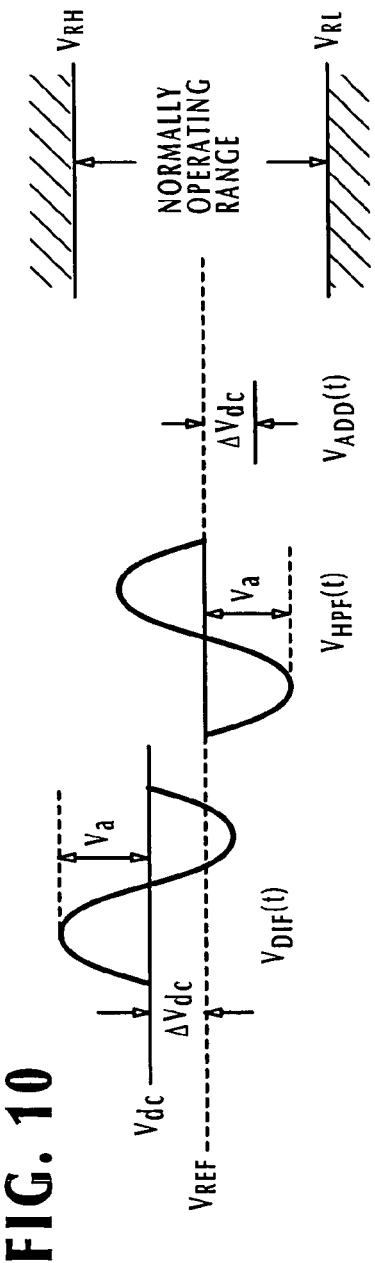
FIG. 10 is a waveform diagram illustrating the operation of the anomaly detector of FIG. 8.

The input and output voltages of the high-pass filter 51 are in opposite phase to each other as they would appear as shown in FIG. 10 (assuming that R6/R5 of Equation (11) is set equal to 1), and the output of adder 52 would vary centered about the reference voltage $V_{REF}$ in the range between $V_{RH}$ and $V_{RL}$ if the angular rate sensor is operating properly. More particularly, the window comparator 53 determines whether the difference voltage $\Delta V_{dc}$ between the adder output $V_{ADD}$ and the reference voltage $V_{REF}$ falls within the range of thresholds. If the difference voltage goes outside the threshold range, the window comparator 53 delivers a low-level output from the AND gate 53f as a warning signal.

As in the first embodiment of the present invention, the anomaly detector 50 has no timing delay for detecting an abnormal offset voltage and is capable of detecting a transient abnormal rise that can occur in the DC offset voltage due to the absence of delay-introducing element.

A further advantage of the present invention is that the amount of space to be reserved on an integrated circuit chip for forming the resistors of high-pass filter 51 can be significantly reduced. This arises from the fact that since the resistor 51g is connected between the circuit node of resistors 51d and 51f and the source of reference voltage $V_{REF}$, instead of forming a single resistor with a high resistance value, the equivalent resistance $R_F$ of resistors 51d, 51e, 51f is given as follows:

$$R_F = \frac{R1 \cdot R2}{R3} + R1 + R2 \quad (12)$$

where, R1, R2 and R3 are resistance values of resistors 51d, 51d and 51f, respectively. By selecting a low resistance value R3 for resistor 51f, a large equivalent resistance RF can be easily implemented. This allows low resistance values R1 and R2 to be used for resistors 51d and 51e as well.

However, one shortcoming of the high-pass filter 51 is that the input offset voltage of operational amplifier 51a is amplified by a factor (1+R2/R3) and appears at its output terminal and lowers the degree of precision for detecting the input offset voltage.

Figure 11:
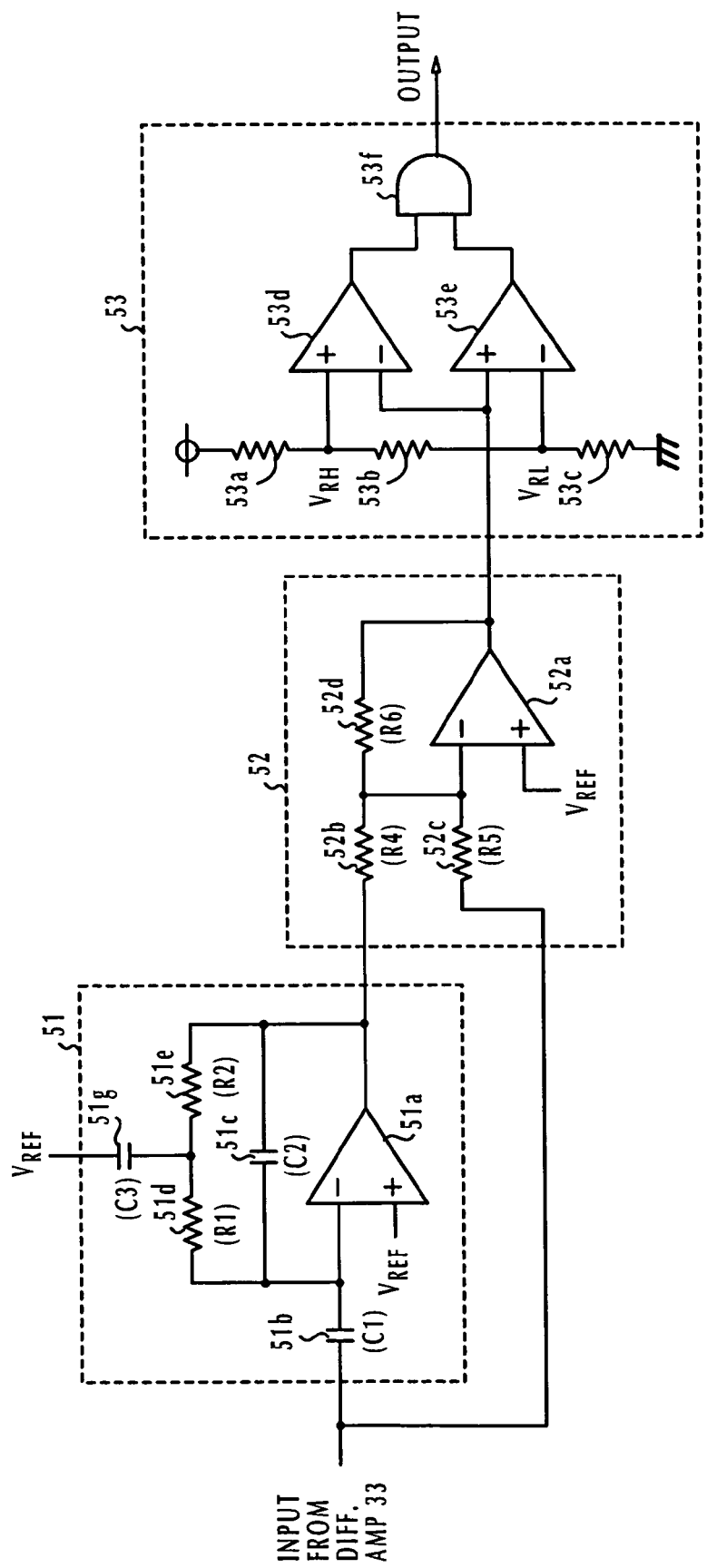
FIG. 11 is a modified circuit diagram of the anomaly detector of FIG. 8.

As shown in FIG. 11, this shortcoming can be avoided by preventing a DC current from being fed back to the reference voltage source $V_{REF}$ using a capacitor 51g, instead of the resistor 51f. The equivalent impedance $Z_F$ of the resistors 51d, 51d and capacitor 51g is given as follows:

$$Z_F = j \cdot \omega_d \cdot R1 \cdot R2 \cdot C3 + R1 + R2 \quad (13)$$

where C3 is the capacitance value of capacitor 51g. A desired high absolute value can be obtained for the equivalent impedance $Z_F$ by appropriately determining the capacitance C3. Note that the capacitor 51g may be connected to ground or Vcc, instead of to the reference voltage source $V_{REF}$.

While mention has been made of a high-pass filter 51 whose output is opposite in phase to its oscillation input signal, the present invention allows the use of a filter circuit in so far as it extracts an AC component that is in phase with the input signal. In this case, a subtractor is used instead of the adder 52 for detecting the DC offset voltage of the oscillation signal.

Further, while mention has been made of embodiments in which the anomaly detector of this invention is used in a vibratory angular rate sensor or gyro-sensor, the anomaly detector of the present invention can equally be used in conjunction with other type of sensors as well.

What is claimed is:

1. An anomaly detector for detecting a DC component of an oscillator signal, comprising:
   a DC component detector that detects a DC component of said oscillation signal, said detector including no timing delay element that introduces a delay in detecting said DC component, said a DC component detector producing, from said oscillation signal, a pair of first and second signals having amplitudes of opposite polarities so that at least one of said first and second signals contains said DC component of the signal, and combining said first and second signals to detect said DC component by mutually canceling said amplitudes of opposite polarities, wherein said DC component detector includes:
      a maximum detector that detects a positive peak value of said oscillation signal at periodic intervals; and
      a minimum detector that detects a negative peak value of said oscillation signal at said periodic intervals synchronously with said maximun detector; and
   a window comparator, associated with said DC component detector, that determines whether the detected DC component is within a predetermined range, wherein said window comparator has an upper threshold value defining the upper limit of said predetermined range and a lower threshold value defining the lower limit of said predetermined range, and said window comparator defines a midpoint value between said upper and lower threshold values corresponding to twice the value of said DC component that is generated when said DC component is of a normal value.

2. An anomaly detector for detecting a DC component of an oscillator signal comprising:
   a DC component detector that detects a DC component of said oscillation signal, said detector including no timing delay element that introduces a delay in detecting said DC component, said a DC component detector producing, from said oscillation signal, pair of first and second signals having amplitudes of opposite polarities so that at least one of said first and second signals contains said DC component of the signal, and combining said first and second signals to detect said DC component by mutually canceling said amplitudes of opposite polarities, wherein said DC component detector includes:
      a maximum detector that detects a positive peak value of said oscillation signal at periodic intervals; and
      a minimum detector that detects a negative peak value of said oscillation signal at said periodic intervals synchronously with said maximum detector, wherein each of said periodic intervals is greater than a period of said oscillation signal; and
   a window comparator, associated with said DC component detector, that determines whether the detected DC component is within a predetermined range.

3. An anomaly detector for detecting a DC component of an oscillator signal comprising:
   a DC component detector that detects a DC component of said oscillation signal, said detector including no timing delay element that introduces a delay in detecting said DC component, said a DC component detector producing, from said oscillation signal, a pair of first and second signals having amplitudes of opposite polarities so that at least one of said first and second signals contains said DC component of the signal, and combining said first and second signals to detect said DC component by mutually canceling said amplitudes of opposite polarities, wherein said DC component detector produces said first signal by extracting an AC component from the oscillation signal and produces said second signal by directly using the oscillation signal to detect the AC component contained therein with the extracted AC component; and
   a window comparator, associated with said DC component detector, that determines whether the detected DC component is within a predetermined range.

4. The anomaly detector of claim 3, wherein said DC component detector comprises a filter for high-pass filtering said oscillation signal to produce said first signal.

5. The anomaly detector of claim 4, wherein said filter comprises:
   an input terminal to which said oscillation signal is applied;
   an operational amplifier having a noninverting input connected to a source of reference voltage and an inverting input;
   a first capacitor connected between said input terminal and said inverting input of said operational amplifier;
   a second capacitor connected between an output of said operational amplifier and said inverting input of the operational amplifier; and
   an impedance circuit connected in parallel with said second capacitor.

6. The anomaly detector of claim 5, wherein said impedance circuit comprises:
   a series of first and second resistors forming a circuit node therebetween; and
   a third resistor connected between said circuit node and said source of reference voltage.

7. The anomaly detector of claim 5, wherein said impedance circuit comprises:
   a series of first and second resistors forming a circuit node therebetween; and
   a third capacitor connected between said circuit node and a constant potential level.

8. A sensing circuit comprising:
   a sensing element that produces a signal representing oscillator of the sensing element in response to an externally applied force;
   a DC component detector, associated with said conversion circuitry, that detects a DC component of said voltage, said detector including no timing delay clement that introduces a delay in detecting said DC component said a DC component detector producing, from said oscillation signal, a pair of first and second signals having amplitudes of opposite polarities so that at least one of said first and second signals contains said DC component of the signal, and combining said first and second signals to detect said DC component by mutually canceling said amplitudes of opposite polarities, wherein said DC component detector includes:
      a maximum detector that detects a positive peak value of said oscillation signal at periodic intervals; and
      a minimum detector that detects a negative peak value of said oscillation signal at said periodic intervals synchronously with said maximum detector; and
   a window comparator, associated with said DC component detector, that determines whether the detected DC component is within a predetermined range, wherein said window comparator has an upper threshold value defining the upper limit of said predetermined range and a lower threshold value defining the lower limit of said predetermined range, and said window comparator defines a midpoint value between said upper and lower threshold values corresponding to twice the value of said DC component that is generated when said sensing circuit is operating properly.

9. A sensing circuit comprising:
a sensing element that produces a signal representing oscillator of the sensing element in response to an externally applied force;
a DC component detector, associated with said conversion circuitry, that detects a DC component of said voltage, said detector including no timing delay element that introduces a delay in detecting said DC component said a DC component detector producing, from said oscillation signal, a pair of first and second signals having amplitudes of opposite polarities so that at least one of said first and second signals contains said DC component of the signal, and combining said first and second signals to detect said DC component by mutually canceling said amplitudes of opposite polarities, wherein said DC component detector includes:
  a maximum detector that detects a positive peak value of said oscillation signal at periodic intervals; and
  a minimum detector that detects a negative peak value of said oscillation signal at said periodic intervals synchronously with said maximum detector, wherein each of said periodic intervals is greater than the period of said oscillation signal; and
a window comparator, associated with said detector, that determines whether the detected DC component is within a predetermined range.

10. A sensing circuit comprising:
a sensing element that produces a signal representing oscillator of the sensing element in response to an externally applied force;
a DC component detector that detects a DC component of said voltage, said detector including no timing delay element that introduces a delay in detecting said DC component said a DC component detector producing, from said oscillation signal, a pair of first and second signals having amplitudes of opposite polarities so that at least one of said first and second signals contains said DC component of the signal, and combining said first and second signals to detect said DC component by mutually canceling said amplitudes of opposite polarities, wherein said DC component detector produces said first signal by extracting an AC component from the oscillation signal and produces said second signal by directly using the oscillation signal to cancel the AC component contained therein with the extracted AC component; and
a window comparator, associated with said detector, that determines whether the detected DC component is within a predetermined range.

11. The sensing circuit of claim 10, wherein said DC component detector comprises a filter for high-pass filtering said oscillation signal to produce said first signal.

12. The sensing circuit of claim 11, wherein said filter comprises:
an input terminal to which said oscillation signal is applied;
an operational amplifier having a noninverting input connected to a source of reference voltage and an inverting input;
a first capacitor connected between said input terminal and said inverting input of said operational amplifier;
a second capacitor connected between an output of said operational amplifier and said inverting input of the operational amplifier; and
an impedance circuit connected in parallel with said second capacitor.

13. The sensing circuit of claim 12, wherein said impedance circuit comprises:
a series of first and second resistors forming a circuit node therebetween; and
a third resistor connected between said circuit node and said source of reference voltage.

14. The sensing circuit of claim 12, wherein said impedance circuit comprises:
a series of first and second resistors forming a circuit node therebetween; and
a third capacitor connected between said circuit node and a constant potential level.

15. The sensing circuit of claim 11, wherein said DC component detector comprises an adder that combines said high-pass filtered oscillation signal with the AC component of said oscillation signal to detect said DC component.

16. A method of detecting an anomaly of an oscillator signal comprising:
detecting a DC component of said oscillation signal without using a timing delay element that introduces in detecting said DC component, wherein said detecting step includes:
  determining whether the detected DC component is within a predetermined range, wherein said determining includes high-pass filtering said oscillation signal to produce a replica of said AC component of the oscillation signal; and
  producing, from said oscillation signal, a pair of first and second signals having amplitudes of opposite polarities so that at least one of said first and second signals contains said DC component of the signal, wherein said producing includes combining the high-pass filtered signal with said oscillation signal to cancel the AC component of the oscillation signal with said replica to detect said DC component; and
determining whether the detected DC component is within a predetermined range.

* * * * *